(12) United States Patent
Kormilitsyn et al.

(10) Patent No.: US 8,376,145 B2
(45) Date of Patent: Feb. 19, 2013

(54) DEVICE FOR PURIFICATION OF WATER FROM PETROLEUM AND / OR PETROLEUM-DERIVED PRODUCTS

(75) Inventors: Vladimir Ilych Kormilitsyn, Moscow (RU); Vladimir Pavlovich Lobko, Yubileyniy (RU); Oleg Olegovich Tikhonenko, Moscow (RU)

(73) Assignee: Troy Group Holdings Ltd., Road Town, Tortola (VG)

( * ) Notice: Subject to any disclaimer, the term of this patent is extended or adjusted under 35 U.S.C. 154(b) by 97 days.

(21) Appl. No.: 13/068,003

(22) Filed: Apr. 29, 2011

(65) Prior Publication Data
US 2012/0273402 A1 Nov. 1, 2012

(51) Int. Cl.
*C02F 1/00* (2006.01)
*B01D 57/00* (2006.01)

(52) U.S. Cl. ............... 210/348; 210/416.1; 210/170.09; 210/170.11; 210/799; 210/923; 210/242.3

(58) Field of Classification Search ........................ None
See application file for complete search history.

(56) References Cited

U.S. PATENT DOCUMENTS

| | | | | |
|---|---|---|---|---|
| 3,529,720 A | * | 9/1970 | Chablaix | 210/123 |
| 3,595,392 A | * | 7/1971 | Markel | 210/800 |
| 3,669,275 A | * | 6/1972 | Downs | 210/242.4 |
| 3,724,662 A | * | 4/1973 | Ortiz | 405/65 |
| 3,726,406 A | * | 4/1973 | Damberger | 210/242.3 |
| 3,754,653 A | * | 8/1973 | Verdin | 210/197 |
| 2012/0273402 A1 | * | 11/2012 | Kormilitsyn et al. | 210/170.01 |

* cited by examiner

*Primary Examiner* — Robert James Popovics
(74) *Attorney, Agent, or Firm* — Aleksandr Smushkovich

(57) ABSTRACT

The invention relates to environment protection and can be used for cleaning industrial wastewater, liquidation of oil spills resulted from ecological disasters. The invention provides a reliable device for cleaning water from oil nano- and micro-particles and other impurities. Such device comprises a pump pumping a liquid flow of water with impurities particles. The pump is connected to a water dynamic purification unit (WDPU) with a channel including —a first type section with variable cross-section decreasing downstream, —a minimal passage cross-section, —a second type section with variable cross-section increasing downstream. The first type section includes a zone with a plurality of protrusions and deepenings. One protrusion has a maximal height greater than the heights of other protrusions. Preferable sizes and relations of channel elements are disclosed. The WDPU uses cavitation that allows decomposing oil particles, and reduction of the flow speed for commencement of cavitation and sedimentation time.

1 Claim, 15 Drawing Sheets

B - B

2

DEVICE FOR PURIFICATION OF WATER FROM PETROLEUM AND / OR PETROLEUM-DERIVED PRODUCTS

FIELD OF THE INVENTION

The present invention relates to environmental protection, particularly to the field of purification of water from nano- and micro-particles of petroleum and petroleum-derived products, herein further collectively called 'oil'. Also, herein 'water' means rivers, lakes, seas, oceans, and other water supply sources. The invention can be used in water supply installations, water-intake systems for household needs and drinking water, in the oil-gas industry for industrial wastewater treatment, as well as for liquidation of oil spills resulted from technological and ecological disasters.

BACKGROUND OF THE INVENTION

The problem of cleaning water from impurities, especially from oil spills, appears one of the most important problems encountered by people.

Scientists of the Moscow State University have discovered that about 25 million tons of oil get into the bio-sphere in Russia alone. It should be noted that regular oil production and delivery activities cause even more pollutions in the ocean than technological/ecological failures. Some specialists believe that up to 20% of the area of world's oceans is covered by oil films with a thickness of about tens of microns. This film hampers feeding and breathing of fish and sea animals (http://www.infox.ru/science/planet/2010/05/12/Vosstanovlyeniye_Mye.phtml).

Though oil bio-degrades in the nature, such process may last for many years. Participants of biocenosis (biotic assemblage) are capable of utilizing practically any organic compound: from methane to heavy oil fractions, but with different rates. Micro-organisms oxidize toxic compounds, converting them into non-dangerous substances. Heavy fractions sedimentate on the bottom (seabed), wherein they are 'buried' in the soil by bottom dwellers.

Another aspect of the problem of oil water pollution relates to the fact that an oil film having a thickness of only one molecule (10-20 nanometers) reduces evaporation from the water surface by about 20%. An oil film having a thickness of 50 micrometers reduces evaporation from the water surface by about 60%. Such film also diminishes the vertical natural intermingling of water. It is understood that such an accumulated solar energy reservoir is capable of significant influence as to regional weather, for instance it can feed hurricanes with energy.

There are presently a lot of methods developed for cleaning water from oil. These methods can fall into a number of large groups.

1. Mechanical cleaning methods. A wide-spread mechanical cleaning method essentially comprises an extraction of oil by means of gravity sedimentation with a subsequent recapture thereof by special devices called oil-gasoline traps, thickening devices, or even hand separation devices. The mechanical machines however are not efficient for cleaning water from oil nano- or micro-particles.

Another kind of mechanical methods is filtration of water. Filters are efficient in cleaning water from micro-particles of oil. A major disadvantage of filters is fast accumulation of oil therein that leads to decreasing the cleaning efficiency and device productivity. Newly proposed nano-sorption filters also quickly accumulate micro-particles of oil and require often replacement.

Nowadays, the most promising mechanical methods for cleaning water from oil nano- and micro-particles are membrane purification methods. In these methods, semipermeable membranes are used. A semipermeable membrane is a partition capable of passing water therethrough, while entrapping particles having a diameter greater than the water molecule's diameter. Such membranes consist of cells with a diameter sized from tens of nanometers (made of materials: polycarbonate, polyether) to hundreds of nanometers (made of materials: cellulose ester, polytetrafluorethylene, polyethylene, polypropylene). A semipermeable membrane requires water supply with a pressure from tens to hundreds of atmosphere. A major drawback of the membrane purification methods is still fast accumulation of oil particles in the membrane.

2. Chemical cleaning methods. They can also be employed for cleaning water from nano- and micro-particles of oil. Many chemical cleaning methods contemplate adding certain chemical reagents into water, wherein the chemical reagents are capable of reacting with oil and sedimentating oil particles in the form of insoluble precipitations. These chemical cleaning methods usually allow for a reduction of oil pollutions by 95%. However, the use of the chemical reagents for a further increase of cleaning quality leads to an intensification of water pollution by the chemical reagents, therefore the purification capacity of these chemical cleaning methods is limited.

Another kind of chemical cleaning methods envisages adsorbing the oil particles by various types of adsorbents, for instance, aluminosilicate micro-spheres or aluminum oxide, with a subsequent burning-off of the oil particles from the sorbent pores. The cleaning extent of this method can reach up to 98%, but it's limited by the area of oil pollution. In the other words, the method can be employed for cleaning oil polluted water located in limited and substantially immovable boundaries. It is difficult to utilize the method in fast flowing rivers and waved seas. Besides, the method still cannot be used for full purification of water.

3. Biological methods of water cleaning are based on the use of special micro-organisms (bacteria) fed by oil and thereby destroying the oil particles. At present, there are known more than one thousand of micro-organisms capable of such processing hydrocarbons of different classes. Bacteria life activity products and dying bacteria themselves can be easily digested by aboriginal micro-flora contained in the water reservoir, forming bottom silt. The method allows attaining an oxidation efficiency of oil hydrocarbons up to 99%.

However, the aforementioned biological cleaning method can be efficiently used for cleaning oil nano- and micro-particles located in a water area with limited and substantially immovable boundaries. It is difficult to utilize the method in fast flowing rivers and waved seas. Besides, for full purification of water, a very large quantity of micro-organisms is required. As the concentration of oil in water reduces, the amount of food for the micro-organisms decreases that causes death of the micro-organisms. This leads to the necessity of feeding the micro-organisms using special food, and this food also pollutes the water.

For a long time, the instant inventors were involved in a process of burning out of water-contained masut (boiler oil) and other petroleum-derived products and designing various dispersers therefor. The dispersers contained a water-masut mixture that was moving under cavitation (Russian Federation Patents: RU2306972, RU2310132, RU2310133). As known, during cavitation, a collapse of air/steam bubbles takes place with an increase of temperature (up to several thousand degrees) and an increase of pressure (up to several thousand atmospheres). This fact has led the inventors to an idea of deploying cavitation for cleaning water from nano- and micro-oil particles by means of burning-off the particles in a water flow under cavitation.

There is known a device for cleaning wastewater containing oil products described in a Russian Federation Patent RU2408540, issued 10 Jan. 2011. The device includes hydro-cyclones, cylindrical chambers mounted the hydro-cyclones' drains, sinker divided by vertical partitions into sections with perforated distribution units located therein, while the lower portion of the sinker contains a tube-like holed collector being part of a system for deposit deduction and another system of washing the deposits out, which washing system is located above the collector and symmetrically on two sides thereof and comprises supercharging tube-like telescopic collectors. The device has a shortcoming of low efficiency for cleaning water from nano- and micro-oil particles. The oil particles are extremely difficult to separate from water due to the fact that their densities are almost equal and the adhesion forces of the oil and water particles are significantly great.

Another related art device for cleaning and deactivating a water medium is described in a Russian Federation Patent RU2170713, issued 20 Jul. 2001. The device comprises a circulation contour including a jet pump with an ejector and a cavitation chamber, photo-chemical reactor and a filter. This device is used for cleaning and deactivation (de-contamination) of water from organic, non-organic, toxic pollutions, and from pathogenic micro-flora. The cavitation process is provided by means of an ultra-sound emitter. It can also comprise an additional cleaning means in the form of at least one UV-radiator. The device has a disadvantage of low efficiency for cleaning water from oil nano- and micro-particles. It consumes two—three times more energy than the claimed device does.

The closest related art device (herein also called a 'prototype') for cleaning water from oil nano- and micro-particles, known to the instant inventors, is described in a Russian Federation Patent 2343951 issued 20 Jan. 2009. The prototype includes a unit for dynamic processing water polluted by oil (herein further called a 'dynamic water processing unit'), which unit comprises a housing with a channel for water flow, wherein the channel has a section (portion) characterized with a variable passage cross-section gradually decreasing along the water flow direction.

Besides, the housing contains a divisional container with a horizontal partition that divides the container into an intake and a gravitation compartments. Additionally, the container has a number of vertical partitions, some of them are made holed. The device also comprises a branch pipe (outlet pipe fitting) for outlet of gases in the upper portion of the divisional container, and another branch pipe for outlet of water and oil. The prototype device purifies water by means of coagulation, chemical processing, adsorption, and rotation in a centrifuge.

The prototype has a shortcoming of low efficiency of cleaning water from oil. The prototype device can hardly separate the oil particles, including nano- and micro-particles, from water due to the fact that their densities are almost equal, and the attraction forces therebetween are extremely intense. It should be noted that the prototype does not use cavitation for cleaning water from oil particles that the instant inventors also consider a shortcoming.

The claimed device has a design in a way similar to a design of a disperser used for preparation of fuel mixtures. Hence, some terms form a publication http://newtechnolog.narod.ru/articles/34article.html were used in this description.

A number of dispersers have been described in the related art, for example: a book by Ganiev R. F. et al "Wave technology for preparation of alternative fuels and efficiency of combustion thereof" published by Scientific Publishing Center "Regular and Chaotic Dynamics" (Moscow 2008), page 116; Russian Federation Patents: RU2293599, RU2336938, RU2285558. The latter describes a channel for moving a fuel mixture and units providing cavitation during a streamline flow of the mixture around thereof. RU2239491, (issued 10 Nov. 2004) teaches a disperser comprising a housing with a channel for a liquid fuel, which channel includes a section with a variable passage cross-section decreasing along the channel's length, a minimal passage cross-section, and a section with a variable passage cross-section increasing along the channel's length.

The aforementioned related art dispersers were experimentally used (researched) by the instant inventors for cleaning water from oil. The experiments revealed the following disadvantages of these dispersers:

The initiation of cavitation requires a high speed of liquid flow. For a liquid flow moving along the channel, in case of non-disturbance conditions, the experiments showed that the cavitation process launched at a significantly greater flow speed than a flow speed observed for a liquid flow moving along the channel in case of disturbance conditions. A reduction of the speed corresponding to the launch of cavitation was achieved by providing transverse corrugations, or protrusions and deepenings, formed on the channel's surface that were located on the section with the decreasing passage cross-section, as taught in RU2293599. RU2336938, teaches that the speed, corresponding to the launch of cavitation, can be reduced by placing a plate at the entrance of disperser that closes a portion of the channel's passage cross-section.

Cavitation occupies a relatively small volume inside the channel.

The aforesaid disadvantages are overcome in the instant invention.

AIM, ADVANTAGES, AND BRIEF DESCRIPTION OF THE PRESENT INVENTION

The primary aim of the claimed invention is to provide a reliable purification of water from oil nano- and micro-particles. The invention provides the following results:

decomposing oil particles into hydrogen and carbon during cavitation in an inventive device. As mentioned above, during operation of the inventive device, the oil nano- and micro-particles are subjected to the cavitation processing (collapse of vapor bubbles) in a water flow. The process is characterized with a high temperature (several thousand degrees) and high pressure (several thousand atmospheres) developed in a volume of cavitation (herein also called a 'cavitation zone'), which high temperature and pressure impact the oil particles causing their decomposition within the cavitation zone, followed by an evolution of hydrogen, whereas carbon precipitates. During the experiments, a full purification of water from oil was achieved;

a reduction of the speed for launching cavitation and an expansion of the cavitation zone during the movement of water inside the channel that reduces the consumption of energy necessary for the purification process.

The above listed results are achieved due to a special design of the inventive device for cleaning water from oil particles. In general, the inventive device comprises a pump; and a water dynamic processing unit (WDPU) connected to the pump, wherein the WDPU includes a housing enclosing a channel for passing a water flow therethrough, the channel has an inner surface being in contact with the water flow, the channel comprises a first section (herein also called a 'first type section') having a variable passage cross-section decreasing along the channel's length (i.e. along a longitudinal direction of the channel), a minimal passage cross-section, a second section (herein also called a 'second type section') having a variable passage cross-section increasing along the channel's length, wherein the inner surface of the first section includes a corrugation zone adjacent to the minimal passage cross-section, and the zone has a predetermined number of protrusions and deepenings (may also be collectively called 'corrugations' or 'ribbings') taking turn along the channel's length, wherein at least one of the aforesaid protrusions has a predetermined maximal height (i.e. higher than the other aforesaid protrusions).

The corrugation zone has a width K determined according to the following formula:

$$K=mD, \text{ wherein:}$$

m is a coefficient taking on any value in the range of from 0.001, to 1;

D is the diameter of the minimal passage cross-section of the channel;

The zone has a zone length L that, in preferred embodiments, can be determined according to the following formula:

$$L=nS,$$

wherein n is a coefficient taking on any value in a range of from 0.1, to 0.5;

S is the length of the first section with the decreasing passage cross-section of channel.

Preferably, the WDPU should be capable of operating under a pressure differential of from $0.1*10^5$ Pa to $25*10^5$ Pa.

The distinct features of the invention are: "comprises a pump; and a water dynamic processing unit (WDPU) connected to the pump, wherein the WDPU includes a housing enclosing a channel for passing a water flow therethrough, the channel has an inner surface being in contact with the water flow, the channel comprises a first section (herein also called a 'first type section') having a variable passage cross-section decreasing along the channel's length (i.e. along a longitudinal direction of the channel), a minimal passage cross-section, a second section (herein also called a 'second type section') having a variable passage cross-section increasing along the channel's length, wherein the inner surface of the first section includes a zone adjacent to the minimal passage cross-section, and the zone has a predetermined number of protrusions and deepenings (may also be collectively called 'corrugations' or 'ribbings') taking turn along the channel's length, wherein at least one of the aforesaid protrusions has a predetermined maximal height (i.e. higher than the other aforesaid protrusions). The zone has a width K determined according to the following formula:

$$K=mD, \text{ wherein:}$$

m is a coefficient taking on any value in the range of from 0.001, to 1;

D is the diameter of the minimal passage cross-section of the channel;

The zone has a zone length L that, in preferred embodiments, can be determined according to the following formula:

$$L=nS,$$

wherein n is a coefficient taking on any value in a range of from 0.1, to 0.5;

S is the length of the first section with the decreasing passage cross-section of channel.

Preferably, the WDPU should be capable of operating under a pressure differential of from $0.1*10^5$ Pa to $25*10^5$ Pa."

In a special embodiment of the invention, the WDPU has a capability of introducing water steam into the channel for moving the water flow, particularly, into the channel's section with the decreasing cross-sections and/or into the channel's section with the increasing cross-sections.

The coefficient n may also take on other values not included in the range of from 0.1, to 0.5. The values of the range have been verified by the instant inventors during tests of the invention. I's been experimentally established that the length L of the zone including the taking turn protrusions and deepenings can be determined according to the formula: L=nS.

Though during the experiments, the coefficient n varied in the range of from 0.001, to 0.5, nevertheless the instant inventors believe that it is expedient to limit the range to the narrower one: from 0.1, to 0.5, for achieving a reliable turbulence, especially near the first section with the decreasing passage cross-section along the channel's length.

It is preferable to use a rectangular cross-section channel with a variable vertical height that is a channel that in the plan projection has a strip-like shape with a width K and a length L.

The preferable pressure differential range of from $0.1*10^5$ Pa to $25*10^5$ Pa was suggested based on the results of tests of the inventive device.

Besides, the aforementioned book by Ganiev R. F. et al "Wave technology for preparation of alternative fuels and efficiency of combustion thereof" published by Scientific Publishing Center "Regular and Chaotic Dynamics" (Moscow 2008), page 116, lists the results of tests for dynamic processing of liquids. Page 35, of the book indicates that the pressure differential ranges from $2.21\ 10^5$ Pa to $12.85\ 10^5$ Pa.

In the aforesaid experiments of the inventors, the broader range of from $0.1*10^5$ Pa to $25*10^5$ Pa was tested for cleaning water from oil. At a pressure differential of $0.1*10^5$ Pa, cavitation was visually observed. The WDPU housing was made of organic glass. The pressure varied in the above range by opening or closing a regulative valve of the pipeline for water supply from the pump to the WDPU. The WDPU had two manometers for pressure control located at the entrance and exit of thereof. The cavitation zone could be viewed and its diameter was assessed as equal or exceeding the diameter of minimal passage cross-section of the channel. Thus, a conclusion was made that it was expedient to vary the pressure differential starting from $0.1*10^5$ Pa for the WDPU. For small-size installation, it is suggested to vary the water expenditure from 1, to 7, tons per hour, and to vary the pressure differential from $0.1*10^5$ Pa to $2.5*10^5$ Pa. For large industrial installation, it is suggested to vary the water expenditure from 25, to 50, tons per hour, and to vary the pressure differential from $2*10^5$ Pa to $25*10^5$ Pa.

The inventive nano-purifier may further comprise a degassing unit placed at the entrance of the pump, or in the pipeline connecting the pump with the WDPU. This is conditioned by the fact that gas contained in water may decrease the intenseness of cavitation processes. The cavitation bubbles contain both water evaporation (steam) and gas. The gas causes damping during the collapse of the bubble. Therefore a reduction of the gas fraction leads to an intensification of cavitation. In certain conditions, it is possible to utilize known household degassing unit, such as the one described on (http://www.rw-system.ru/uu_, dw.html).

Experiments conducted by an instant inventor V. I. Kormilitsyn have shown a reduction of the speed of establishing (commencement of) cavitation when water was heated before entering the WDPU. Therefore, the nano-purifier can comprise a water heater placed at the entrance of the pump or in the pipeline connecting the pump with the WDPU.

In an experiment, when water had a temperature of 15° C., cavitation intensified at a speed of about 28 m/s; when water had a temperature of 25° C., cavitation intensified at a speed of about 20 m/s; when water had a temperature of 40° C., cavitation intensified at a speed of about 18, m/s; and when water had a temperature of 55° C., cavitation intensified at a speed of about 12 m/s.

The nano-purifier may further comprise a unit for introduction of water steam into the zone of intense cavitation, which intensifies the cavitation process.

The inventors experimentally established that the cavitation processing reduced the sedimentation time for heavy fractions of petroleum-derived products in water. During the cavitation process, appearance of hydroxyl groups and free radicals was observed. Formation of free radicals was followed by partial destruction of hydrocarbons, also observed in the course of experiments of the cavitation processing of oil.

The aforesaid thermo-destructive processes in oil subjected to cavitation begin at temperatures of 180-350° C., whereas, as mentioned above, the temperature in the cavitation zone may reach several thousand degrees. This provides a deep processing of oil.

In case of the use of cavitation for cleaning wastewater, formation of free radicals involves a deep chemical modification of at least a portion of the pollution compounds. This fact explains a formation of plentiful deposits containing a wide specter of pollution substances after the cavitation processing of wastewater. After the cavitation process for cleaning water polluted with oil and other surface active substances, the inventors noticed a relatively 'explosive' formation of plentiful deposits. In this case it involves activation of chain-type reactions.

At present, there is no exact theoretical explanation of many phenomena involved in the cavitation process. However, the aforementioned observation of formation of insoluble compound deposits, may create a basis for a promising direction for modernizing the existed waste-processing installations.

One more positive aspect of the claimed device is ultra-sound radiation appearing due to a multitude of local hydro-impacts following the collapse of cavitation bubbles.

The inventors, as well as a majority of researchers of the cavitation processes, came to an opinion that independently of the way of initiation of the process (either hydrodynamics or ultra-sound), the main factor leading to the observed physical/chemical processes is a cumulative impact on the liquid medium taking place in the course of cavitation bubbles and presence of ultra-sound (related art references 1, 2, and 3, listed at the end of the present description).

In the experiments, the impact of the ultra-sound component on water containing impurities was established. The presence of the ultra-sound component is conditioned by a specific 'noise' produced by multiple hydro-impacts that follow the collapse of cavitation bubbles.

The use of cavitation as a method for cleaning wastewater and enhancing preparation of water has long attracted the attention of domestic scientists (e.g., see references 4, 5, and 6, listed at the end of the present description).

Presently, a number of domestic companies use water cleansing installation furnished with cavitation devices (e.g., see reference 7, listed at the end of the present description). In reference 7, cavitation is an activated factor increasing the effectiveness of water processing by ultra-violet radiation sources.

An overwhelming majority of inventions related to design of hydrodynamic cavitation devices can be divided into two major groups. A first group includes static cavitation devices (the instant invention can also be related to the first group), and a second group that includes rotor devices. In either case, the initiation of cavitation is provided in a process of a relative motion of the processed water and elements that create a hydrodynamic non-uniformity. Such elements can be shaped as rods, holes, nozzles, etc.

In particular embodiments of the present invention, the WDPU can be designed such that the first type section includes a zone including transversely disposed riffles (grooving).

Additionally, the inner surface of first type channel, being in contact with the liquid flow, may comprise a corrugation zone consisting of transversal deepenings and at least one protrusion outstanding over the deepenings. The WDPU can be mounted in a pipeline by means of flanges, or be welded into forming a single passage channel.

DEFINITIONS AND PREFERRED EMBODIMENTS OF THE INVENTION

Figure 1:
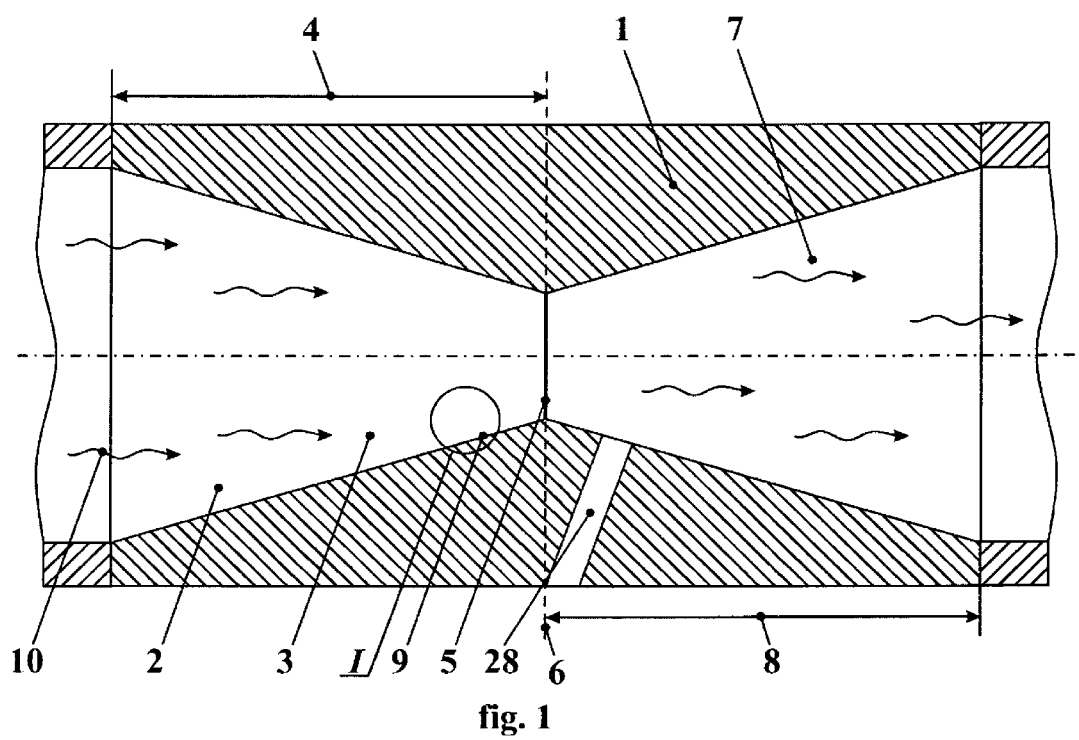
FIG. 1 illustrates a longitudinal sectional view of the WDPU with one channel for passing a water flow, according to an embodiment of the present invention.

The inventive water dynamic processing unit (WDPU) is an apparatus for subjecting water and substances (impurities) contained therein to dynamic cavitation. During the dynamic cavitation processing of water and impurities, an intense agitating of the water and impurities takes place. The WDPU can also be classified as a disperser.

An intense dispergation zone is a volume in a liquid flow, wherein an intense agitating/intermingling of the liquid takes place.

The WDPU comprises a housing, being a base element of the WDPU; the housing encloses a channel/channels for passing a liquid flow therethrough, in particular, a flow of mixture of water and liquid hydrocarbons. The mixture may include other suspended or dissolved substances or chemical compounds.

A 'channel' is a hollow space, for example, a tube. Herein, the WDPU's 'channel' is a hollow space wherein a liquid flow moves therethrough during operation of the WDPU. The channel has a longitudinal axis extended along the direction of liquid flow moving through the channel.

The channel comprises a plurality of sections, in particular: a first type section with a decreasing passage cross-section along the direction of movement of the water flow in the WDPU, a second type section with an increasing passage cross-section along the direction of movement of the liquid flow in the WDPU, and a minimal passage cross-section located between the first and second type sections. During operation of the WDPU, an intense dispergation zone (intense cavitation zone) is formed in the vicinity of the minimal passage cross-section.

A section with a decreasing variable passage cross-section is a section characterized in that its cross-section decreases along the direction of movement of water in the WDPU. This definition describes a static arrangement of the channel.

The first type section is characterized in that the area of any passage cross-section of the channel (e.g. 'left' cross-section) is greater than the area of another cross-section of the channel (e.g. 'right' cross-section) situated downstream along the liquid movement direction. The second type section is characterized in that the area of any passage cross-section of the channel (e.g. 'left cross-section') is less than the area of another cross-section of the channel (e.g. 'right cross-section') situated downstream along the liquid movement direction.

The definition of "section with a variable increasing cross-section" describes a static arrangement of the channel. A section with an increasing variable passage cross-section is a section characterized in that its cross-section increases along the direction of movement of water in the WDPU.

A passage cross-section of the channel is a cross-section through which a liquid flow is passed. The passage cross-section is a portion of a cross-section of the WDPU's housing, which housing cross-section is disposed perpendicular to the longitudinal axis of the channel at the point of location of the given housing cross-section. The passage cross-section is characterized by an area thereof.

Turning to the drawings, FIG. 1 depicts the WDPU comprising a housing 1 with a through channel 2 enclosed in the housing 1, a liquid flow moves through the channel 2 in a certain direction from an entrance to an exit. The liquid flow includes water and oil particles. Along the flow direction, the channel 2 comprises: a first type section having a length 4, and characterized with a decreasing passage cross-section 3; a minimal cross-section 5; and a second type section having a length 8, and characterized with an increasing passage cross-section 7.

Figure 2:
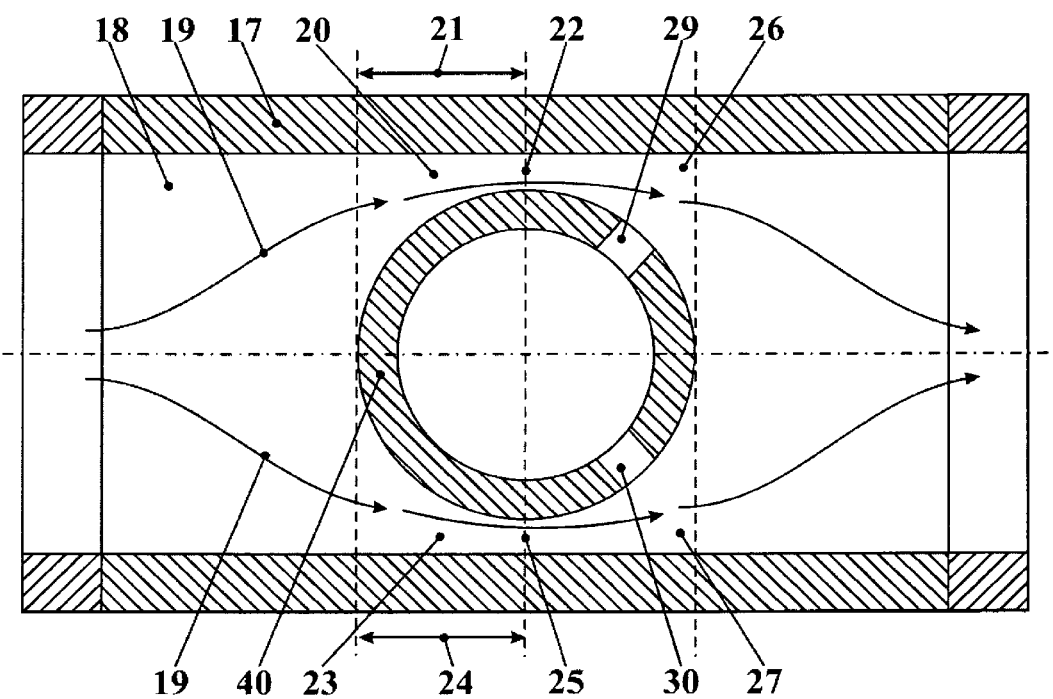
FIG. 2 illustrates a longitudinal sectional view of the WDPU with one channel dividing into two channels and reversely merging into one channel for passing a water flow, according to an embodiment of the present invention.

The expression "along the flow direction" means that the sections are located sequentially to each other (e.g. from the left to the right on FIG. 1) towards the movement of a water flow 10 (it's denoted by a reference number 19 on FIG. 2) from the point of entering the WDPU to the point of exiting the WDPU that is downstream. Exemplarily, FIG. 2 shows sections 20 and 26 (of the first type section) located sequentially from the left to the right, and sections 23 and 27 (of the second type section) located sequentially from the left to the right.

Herein, 'riffles' mean grooves arranged on the channel's inner surface. 'Transversal riffles' are those riffles that are arranged at a right angle to the longitudinal axis of the channel, wherein the inner surface is in a contact with the liquid flow passing through the channel. The 'direction of water' is a direction from the entrance of WDPU to the exit of WDPU.

The channel of WDPU may comprise a corrugation zone consisting of the protrusions and deepenings arranged on the channel's inner surface at a right angle to the longitudinal axis of the channel. The corrugation zone is a portion of channel's inner surface having a predetermined positive area.

Figure 3:
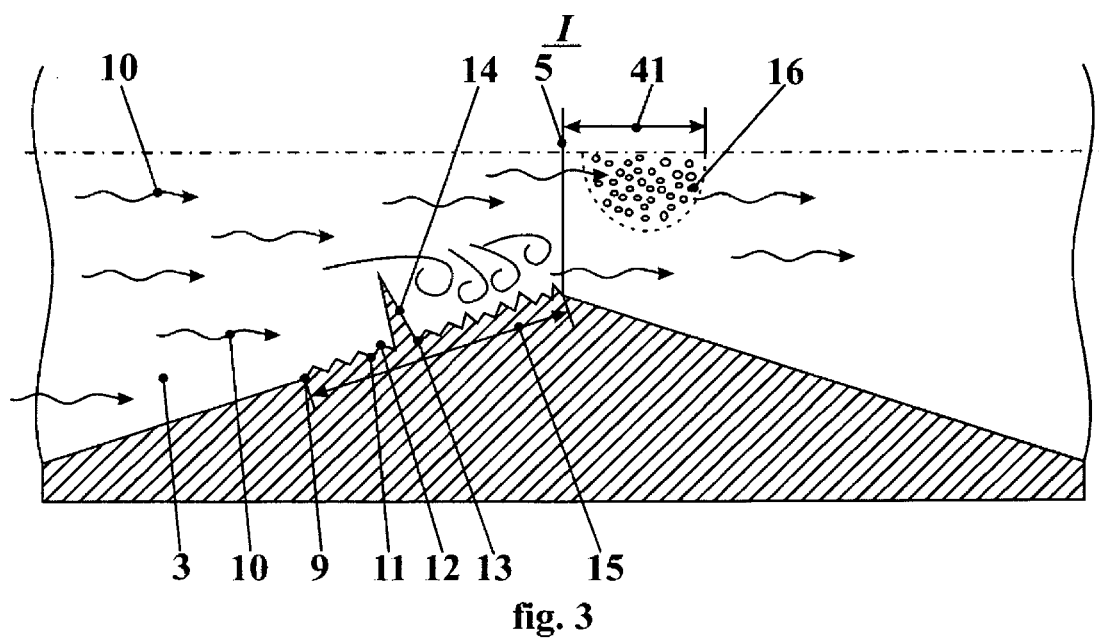
FIG. 3 illustrates a longitudinal sectional view of the WDPU with one channel for passing a water flow, according to an embodiment of the present invention. The channel has an inner surface being in contact with the water flow, and comprises a first section having a variable passage cross-section decreasing along the channel's length, wherein the first section includes a corrugation zone having a predetermined number of protrusions and deepenings taking turn along the channel's length, wherein at least one of the aforesaid protrusions has a height greater than the heights of the other aforesaid protrusions.

The corrugation zone is characterized by a zone length 15, measured along the longitudinal axis of channel, i.e. along a straight line connecting two ending points of the corrugation zone (as shown on FIG. 3).

The first type section of channel is characterized by a length 4 (as shown in FIG. 1) is measured along the longitudinal axis of channel, i.e. along a straight line connecting two ending points of the first section. The length of first type section is also denoted by reference numerals 21 and 24 on FIG. 2.

The second type section of channel is characterized by a length 8 (as shown in FIG. 1) is measured along the longitudinal axis of channel, i.e. along a straight line connecting two ending points of the second type section.

As mentioned above, the corrugation zone consists of protrusions and deepenings. It is very important for the present invention to realize how the protrusions are defined and designed. One can build a longitudinal cross-section of the channel by extending sectional plane through a point of interest on the channel surface. A line of crossing of the sectional plane with the channel's surface is defined as a boundary of the longitudinal cross-section. Herein, a protrusion is measured by a longitudinal projection of an outstanding element on the boundary of the longitudinal cross-section of the corrugation zone of channel.

The longitudinal cross-section is also characterized with a middle line. If there is a pair of points pertaining to the middle line and to the boundary of cross-section, and there is a portion of the cross-section located between the boundary and the middle line, then it can be said that there is a projection between the aforesaid pair of points.

It is said that a section includes a protrusion on a boundary thereof, or a protrusion is located on a boundary of the section between a pair of points. The definition was taken from http://newtechnolog.narod.ru/articles/30article.html, wherein the term 'transversal' was exchanged for 'longitudinal'.

To define a deepening, a longitudinal section extending through a point of interest is to be build. A line of crossing of the sectional plane and the channel's surface is defined as a boundary of the longitudinal section. Therefore a deepening is measured by a longitudinal projection of an indented element on the boundary of the longitudinal cross-section of the corrugation (or riffle) zone of the channel.

If there is a pair of points pertaining to the middle line and to the boundary of cross-section, and there is a space adjacent to the boundary and the space does not pertain to the cross-section, then it can be said that there is a deepening between the aforesaid pair of points. This definition was published on http://newtechnolog.narod.ru/articles/30article.html.

If there is any protrusion neighboring with at least one deepening, and there is a sequence of at least two protrusions and two deepenings, then the protrusions and deepenings are said to take turn.

The protrusions, situated in the aforesaid (first or second type) section, can be formed as a hump, a rod, a prism. The hump can be shaped as a surface portion of a sphere, cone, pyramid, truncated pyramid. The rod can be shaped as a cylinder. The prism can be disposed transversely to the longitudinal axis of the section. The main purpose of the protrusion is the creation of turbulence of the liquid flow at predetermined distances from the surface of the section.

The deepenings, situated in the aforesaid (first or second type) section, can be formed as a transversal groove, riffle, local notch. The main purpose of the deepening is the creation of a space behind the protrusion, which space accommodates an eddy of the turbulence liquid flow.

A surface being in contact with a liquid flow herein means an inner surface of the channel, which contacts with the liquid.

A pressure differential in the WDPU is a difference between the liquid flow pressure at the entrance into the WDPU and at the exit from the WDPU during its operation. The pressure differential can be measured according to manometer readings, registering the amounts of pressure at the entrance and exit of the WDPU.

The WDPU comprises a housing 1 (FIG. 1) with a channel 2 for moving water therethrough. The channel 2 (following downstream) includes a first type section 3 having a length 4, and a minimal passage cross-section 5.

FIG. 1 shows a cross-section 6, depicted by a dashed line, which cross-section 6 extends perpendicularly to the longitudinal axis of channel and through the minimal passage cross-section 5. The second type section 7 has a length 8.

FIG. 3 shows a first type section with an inner surface 9 being in touch with a liquid flow 10. The surface 10 includes a corrugated zone 11, consisting of a plurality of protrusions 12 and deepenings 13, wherein the corrugated zone 11 includes one protrusion 14 whose height is greater than the heights of the other protrusions pertaining to the zone 11. FIG. 3 also shows a length 15 of the zone 11, which is adjoined to the minimal passage cross-section 5 of the channel.

In this case, the length 15 can be denoted as L, which can be calculated from the following formula:

$$L = nS,$$

wherein n is a coefficient taking on any value in a range of from 0.1, to 0.5, chosen according to experimental results;

S is the length 4 (shown on FIG. I) of the first type section. If S=100 mm, L can take on values: 10 mm, 15 mm, 20 mm, 30 mm, 40 mm, 50 mm. S may have other values.

FIG. 3 shows a zone 16 of intensive cavitation (intense dispergation zone).

FIG. 2 shows a longitudinal cross-section of WDPU comprising a housing 17 with a channel 18 for passing a liquid flow 19. The channel 18 divides into two channels: an upper channel and a lower channel. The upper channel consists of: a first type section 20 having a length 21, a minimal passage cross-section 22, and a second type section 26. The lower channel consists of: a first type section 23 having a length 24, a minimal passage cross-section 25, and a second type section 27.

The WDPU may have an optional embodiment with introducing water steam into the channel for passing the liquid flow. Steam can be introduced into the WDPU in a number of ways: at the entrance of WDPU, into the first type section of WDPU, into the second type section of WDPU, using a combination of the above ways.

Exemplarily, the WDPU may employ an introduction of steam during operation of the WDPU: —at the entrance of WDPU (i.e. steam is introduced into the pipeline between the pump and the WDPU itself); —into the first type section of WDPU and/or into the second type section of WDPU. In any case the following condition must be met: the steam pressure at the point of its introduction must be equal or less than the saturated vapor pressure.

A ratio of the steam expenditure to the expenditure of liquid passing the WDPU may constitute from 0.001, to 0.5. In the experiments, the steam expenditure was 1.0, 1.7, 5.5, 10.0, 850.0, and 900.0 gram/sec, whereas the expenditure of liquid was 1,700.0 gram/sec.

The introduction of steam brings up the following effect: cavitation of water is intensified, the size of intense cavitation zone 16 (its length 41 shown on FIG. 3) increases, which effect can be visually observed through a transparent wall of WDPU and can be measured by manometers. In case where the steam/liquid expenditure ratio was less than 0.001, the aforesaid effect could not be observed. In case where the ratio was greater than 0.5, the effect was observed, but the water expenditure through the WDPU decreased. Thusly, the instant inventors recommend that the steam/liquid expenditure ratio be ranged from 0.001, to 0.5.

In a particular embodiment, the WDPU may comprise a steam introduction channel 28 (shown on FIG. 1) for introducing steam into the second type section of WDPU.

FIG. 2 shows an embodiment of the WDPU comprising two steam introduction channels for introducing water steam into the intense cavitation zone at predetermined points. As mentioned above, the channel 18 divides into two channels: an upper channel and a lower channel. It is divided by a divisional body, particularly made in the form of a tube 40 transversely disposed in relation to the longitudinal axis of housing 17. The tube 40 has two steam introduction channels made in the form of orifices 29 and 30 arranged in the tube 40 and disposed downstream from the minimal passage cross-sections 22 and 25.

Figure 4:
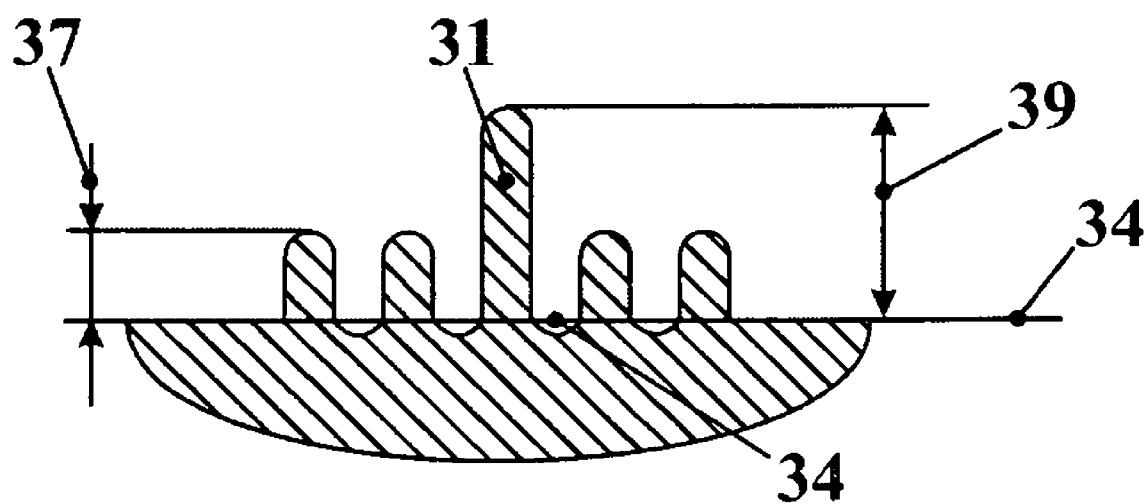
FIGS. 4, 5, and 6 illustrate longitudinal sectional views of the protrusions and deepenings arranged in the corrugation zone of channel for passing a water flow, according to embodiments of the present invention.
Figure 5:
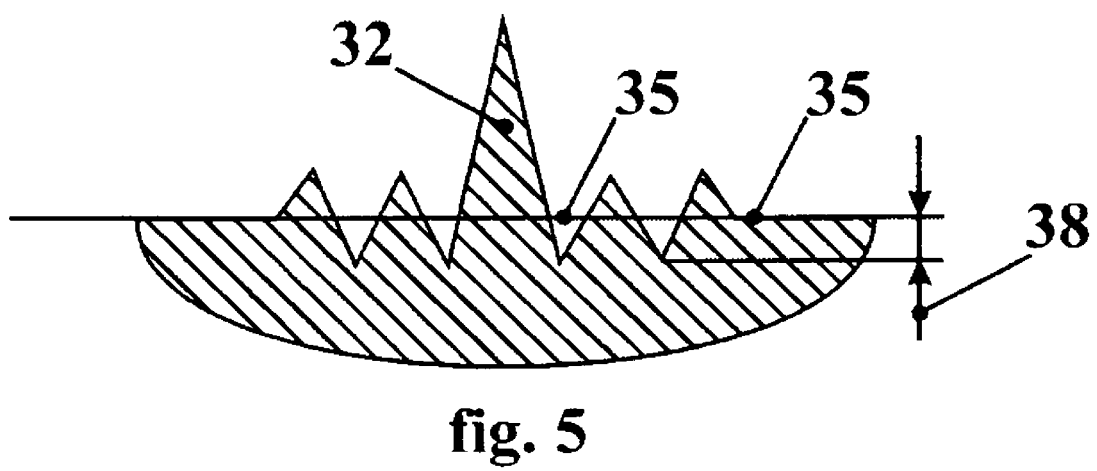
Figure 6:
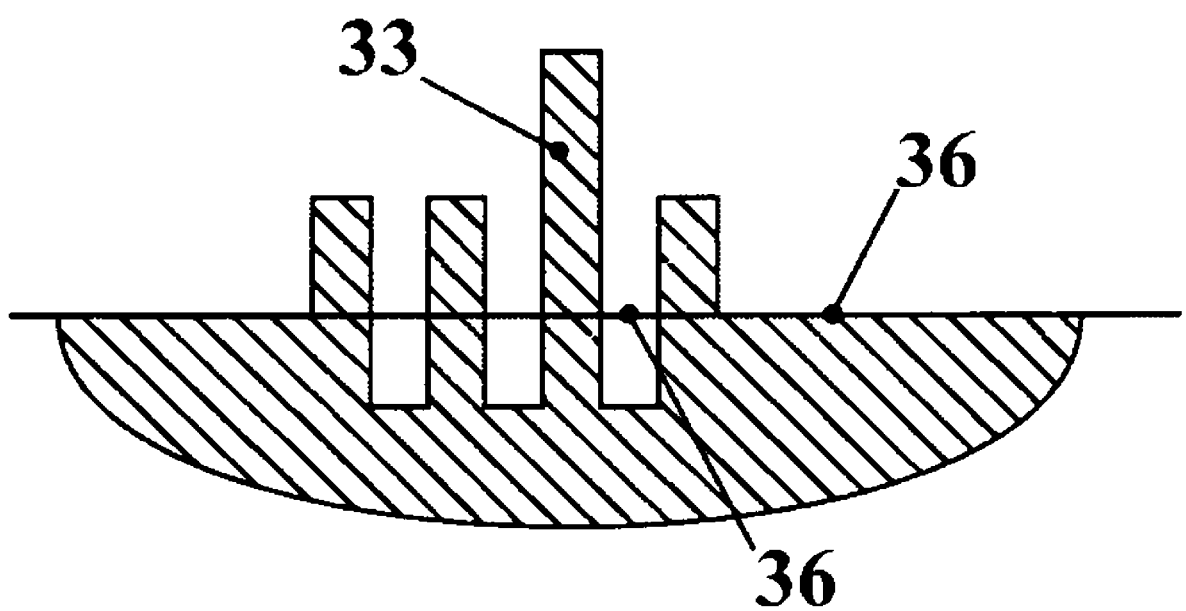

FIGS. 4-6 show the taking turn protrusions and deepenings of different shapes. The maximal height protrusions are denoted 31, 32, and 33. For example, on FIG. 4, the highest protrusion 31 has a height 39, and neighboring protrusion have a height 37 less than the height 39. The heights of the protrusions 31, 32, and 33 and the depth of a deepening 38 are measured from a middle line denoted by reference numerals

34 (shown on FIG. 4, see http://newtechnolog.narod.ru/articles/30article.html), 35 (on FIGS. 5), and 36 (on FIG. 6).

The protrusions and deepenings can have longitudinal cross-sections of practically any shape: rectangular (FIG. 6), quasi-rectangular with rounded tops and bottoms (respectively—FIG. 4), trapezium-like (not illustrated), triangular (FIG. 5), spherical (not illustrated), etc. The depth of deepenings can range from 0.005, to 5, mm, whereas the thickness of housing walls of WDPU should exceed the depth by at least 10%. The height of protrusions can range from 0.005, to 5 mm, whereas the diameter of the corresponding passage cross-section should exceed the height of protrusion at least by 100%.

The height of highest protrusion (having a maximal height) should exceed the height of lowest protrusion (having a minimal height) by 1.1-10, times.

Riffles can arranged on the channel's inner surface, being in contact with the liquid flow. The riffles can be formed of a rectangular, triangular, circular (or rounded) shape in the longitudinal section of channel. The depth of the riffles can range from 0.005, to 5 mm, if the thickness of housing can accommodate such depth.

The geometrical characteristics of the protrusions and deepenings are chosen with taking into consideration of certain conditions of moving the liquid flow around them. The conditions are: —speed of the liquid flow, —pressure of deceleration of the liquid flow, —liquid density, —location of the protrusions and deepenings in relation to the minimal passage cross-section of the channel. The main purpose of these elements is the creation of a maximal disturbance of the liquid flow before the intense cavitation zone at the channel's walls and in the volume of liquid flow.

As of to date, a number of WDPU embodiment have been tested. The embodiments have been designed with channel diameters ranged from 5, to 100 mm, with a length of the first type section ranged from 50, to 1000 mm, with a depth of the deepenings ranged from 0.001, to 5 mm, and with a height of the protrusions ranged from 0.001, to 5 mm.

It's been noticed that the range of depth from 0.001, to 0.004 mm is low efficient; and the depth should be made at least 0.005 mm and deeper. It's also been noticed that the range of height from 0.001 to 0.004 mm is low efficient; and the height should be made at least 0.005 mm and higher.

It was experimentally proven that a noticeable effect (observable visually and according to readings of measurement devices) is attainted where the height of a maximal protrusion is greater than the height of a minimal protrusion by 1.05-10, times, though the difference of 5% is not efficient. It was established that the preferable range of the height difference is from 1.1, to 10, times.

Agitating the liquid flow 10 in the WDPU is provided during its interaction with the protrusions 12, 14, and deepenings 13 located before (upstream) the intense cavitation zone 16 (see FIG. 3). It is also possible to arrange (not illustrated) a corrugation zone (protrusions and deepenings) within a vicinity of the cavitation zone, which would lead to an expansion of the latter. However, such protrusions would be affected by destructive impacts of dynamic cavitation, and thus the protrusions should be made of highly mechanically strong materials, such as synthetic diamonds, fianites, etc.

In the process of flowing-around the protrusions 12 and 14, and the deepenings 13, the liquid flow is intermingled or being involved in turbulence. The lower protrusions cause intermingling closely to the inner surface of channel, whereas the highest protrusion causes intermingling of layers of the liquid flow situated closely to the center of liquid flow.

Moving further downstream along the first type section 3 (FIG. 3), the liquid accelerates to a speed of 10 m/sec and more. A maximum speed reached in experiments was 50 m/sec.

As mentioned hereinabove, while the flow speed increases, the flow pressure decreases, which leads to formation of steam bubbles in the vicinity of minimal passage cross-section 5 (FIG. 3), between the minimal passage cross-section 5 and the intense cavitation zone 16, and in the intense cavitation zone 16. Moving further downstream along the second type section, the liquid flow decelerates and its pressure increases. The deceleration starts from the minimal passage cross-section 5. During the deceleration, the steam bubbles collapse (i.e. cavitation takes place), providing efficient crush of water and oil particles and agitating thereof.

FIG. 1 shows a steam introduction channel 28, through which steam is introduced into the intense cavitation zone located within the second type section of channel. The introduced steam and cavitation bubbles are collapsed in the intense cavitation zone 16 (shown in FIG. 3), wherein the introduced steam intensifies the cavitation process. Analogously, FIG. 2 shows two steam introduction orifices 29 and 30, through which steam can be injected in the intense cavitation zone.

The inventors have conducted comparative tests of WDPU embodiments with various designs of the protrusions and deepenings. The embodiments were built with housings having transparent walls. Main elements of their design are depicted on FIGS. 1 and 3. A third embodiment (not illustrated) comprised two sequentially connected WDPUs: the first WDPU included design elements shown on FIG. 1, and the second WDPU included design elements shown on FIG. 3. Water was pumped through the WDPUs by a pump.

The section containing the protrusions and deepenings is adjoined to the section 5 (FIG. 3). The length of the section is 20 mm, the width of the section is 3 mm. The number of protrusions is 30, and the number of deepenings is 29.

The WDPUs shown on FIGS. 1 and 3 comprises a corrugation zone 11 (depicted on FIG. 3) adjacent to the minimal passage cross-section 5. In the tested embodiment, the following sizes were used: the length 15 equal to 20 mm; a width of zone 11 equal to 3 mm; a number of protrusions equal to 30; a number of deepenings equal to 29. The protrusions had a height of 0.5 mm except the highest protrusion. The highest (maximal) protrusion was located in the center of zone 11; during the tests, the maximal protrusion's height varied up to 5 mm over the middle line of boundary of the longitudinal cross-section of the channel. Its diameter was equal to 2 mm.

The length of the first type section was 40 mm; the length of the second type section was 40 mm. The tested WDPU had a diameter of the entrance passage cross-section and a diameter of the exit passage cross-section equal to 60 mm. A diameter of the minimal passage cross-section was 5.5 mm.

The length 41 of cavitation zone 16 can be determined visually through the transparent housing of WDPU. During the tests without steam introduction, the length 41 varied from 3, to 7 mm. During the tests with the introduction of steam, the length 41 varied from 5, to 50 mm (i.e. the cavitation zone occupied the entire first type section of the channel). Also, the maximal protrusion was made with a variable height that was changing during the tests, as well as the speed of liquid flow.

The concentration of oil particles in water was changing from 0.005 mGram/L to 500 Gram/L.

Manometers were installed at the entrance and exit of the WDPU. The speed of liquid flow was regulated by a valve mounted in the pipeline between the pump and the WDPU. The speed was measured with a hydrometric spinning device of a ISP-1, type.

The number of protrusions with variable (regulated) heights was changing from 1, to 5.

The test results are placed in the TABLE 1, below. Analysis of the table results has shown that an increase of the protrusion height leads to a decrease of the liquid flow speed in the minimal passage cross-section needed for commencement of the intense cavitation. This allows for a reduction of power of the liquid pump, being part of the nano-purifier, by 20%.

Besides, an increase of the protrusion height causes an expansion of the intense cavitation zone during the movement of liquid flow in the channel. This enhances the quality of dispersion.

The experiments have shown that an increase of the number of higher protrusions to 2, 3, 4, and 5, in the longitudinal cross-section has not lead to an intensification of cavitation.

TABLE 1

Dependency of Speed of Commencement of Intense Cavitation from Height of Variable Protrusion

| No | Height of Variable Protrusion, mm | Liquid Flow Speed in Minimal Passage Cross-Section, meter/sec | Length of Intense Cavitation Zone, mm |
|---|---|---|---|
| 1 | No Protrusion | 19.0 | 3 |
| 2 | 0.5 | 18.0 | 3 |
| 3 | 0.6 | 17.5 | 3 |
| 4 | 0.65 | 17.5 | 3 |
| 5 | 1.0 | 16.7 | 4 |
| 6 | 1.5 | 16.3 | 4 |
| 7 | 2.0 | 16.0 | 5 |
| 8 | 2.5 | 15.7 | 5 |
| 9 | 3.0 | 15.3 | 5 |
| 10 | 3.5 | 14.3 | 6 |
| 11 | 4.0 | 14.0 | 6 |
| 12 | 4.5 | 13.8 | 7 |
| 13 | 5.0 | 13.3 | 7 |

The pressure differential in the WDPU during the tests was 2.1, atmosphere.

Figure 7:
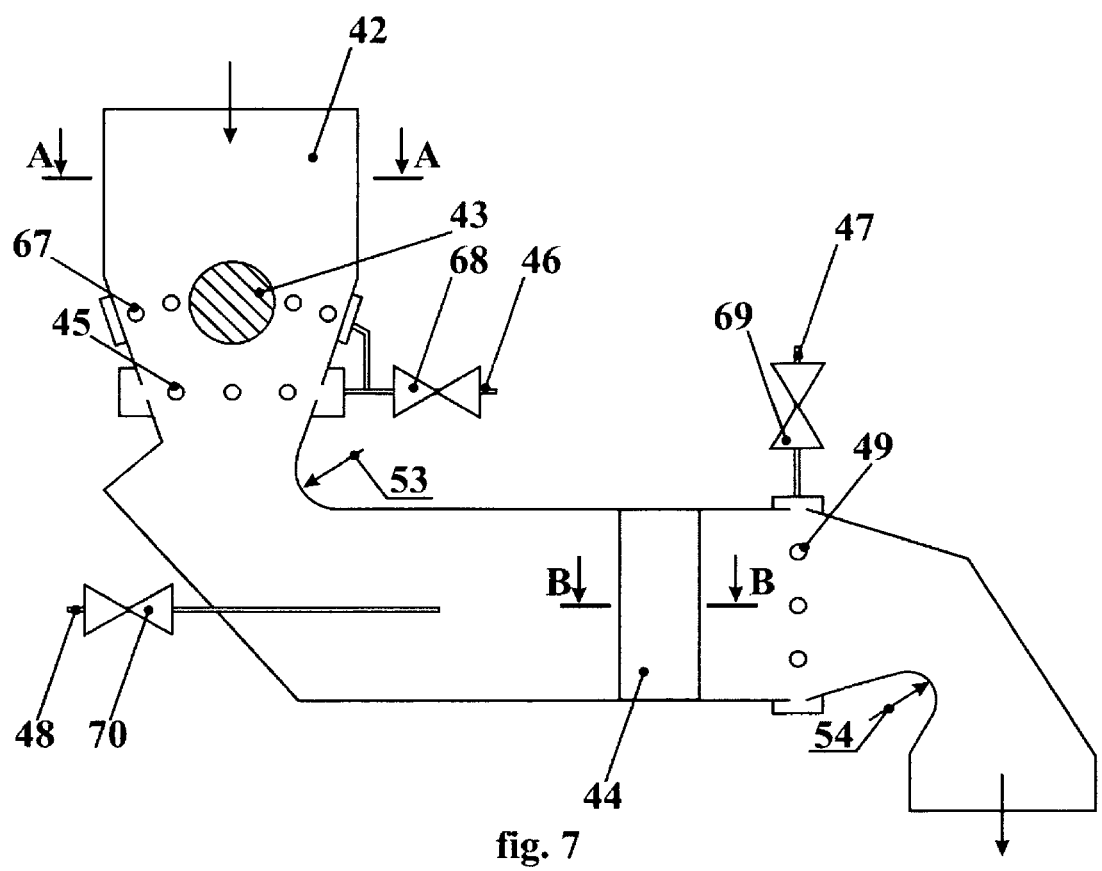
FIG. 7 illustrates a schematic view of the inventive WDPU used in experimental tests, according to an embodiment of the present invention.
Figure 8:
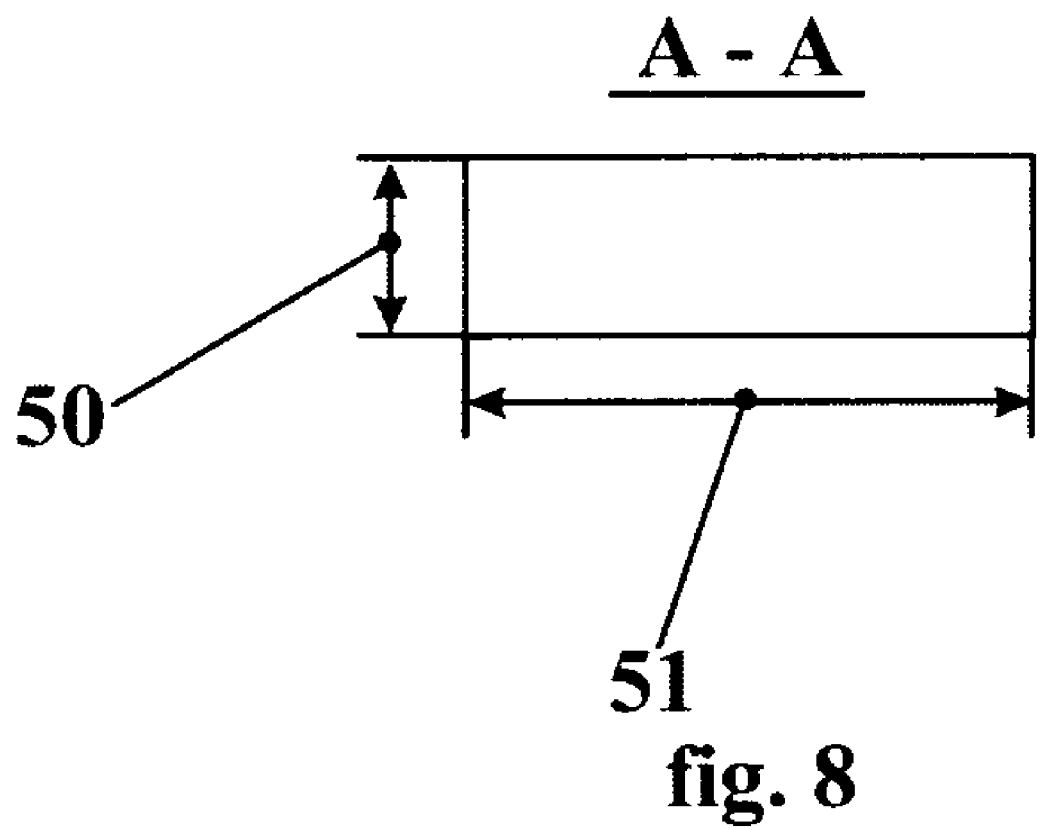
FIG. 8 illustrates a plan sectional view A-A of the WDPU's channel for passing a water flow, according to an embodiment of the present invention.

FIG. 7 shows a WDPU deployed in one of the tests. The WDPU's channel 42 has a rectangular shape (FIGS. 7 and 8). A first divisional body 43 divides the channel 42 into two channels; a second divisional body 44 divides the channel 42 into two channels. The longitudinal axes of bodies 43 and 44 are aligned at a 90° angle to each other. During the tests, the speed of liquid flow at the entrance into the WDPU was changing from 6, to 20 meter/second.

In the channels formed by the body 43 on the second type sections, orifices 67 were located, and orifices 45 (having a diameter of 1.0-2.0 mm) for introduction of steam were located further downstream from the body 43. Water steam is injected via a pipe 46. Orifices 49 (having a diameter of 1.0-2.0 mm) for introduction of steam were located further downstream from the body 44. Water steam is injected via a pipe 47 and also via a pipe 48. Taps 68, 69, and 70 are to regulate the steam supply into the channel.

Figure 9:
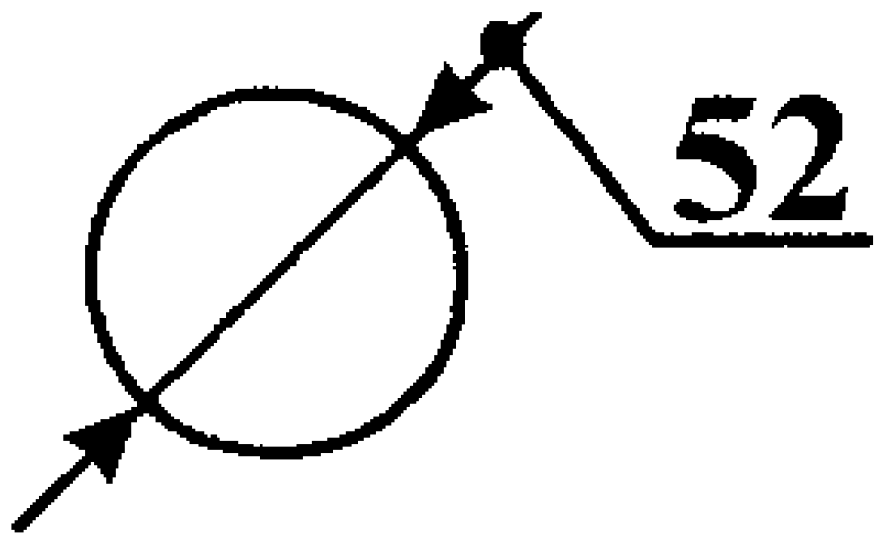
FIG. 9 illustrates a sectional view B-B of a body dividing the channel for passing a water flow into two channels, according to an embodiment of the present invention.

In the A-A cross-section the channel had a height 50 and a width 51 (FIG. 8). The height 50 varied from 4, to 10 mm; the diameter of body 43 varied from 4, to 10 mm, and the diameter of body 44 (FIG. 9) varied from 4, to 10 mm in the tests.

The channel 42 has two rounded knees: 53 and 54 (FIG. 7). They were designed according to a methodology described in Rikhter L. A. Gas-Air Ducts of Heat Power Stations, Moscow, 'Energy' 1969. The rounded configuration provides a smooth turn of the liquid flow, which is important for stabilizing the cavitation process.

During the experiments, a reduction of time for sedimentation of heavy oil fractions in water after the cavitation processing. According to observations, the sedimentation time was reduced in more than 30 times. In one of the experiments, a settler contained water mixed with oil; the oil portion was layered during 168 hours, a fraction of oil emerged and another fraction of oil immersed onto the bottom.

Figure 10:
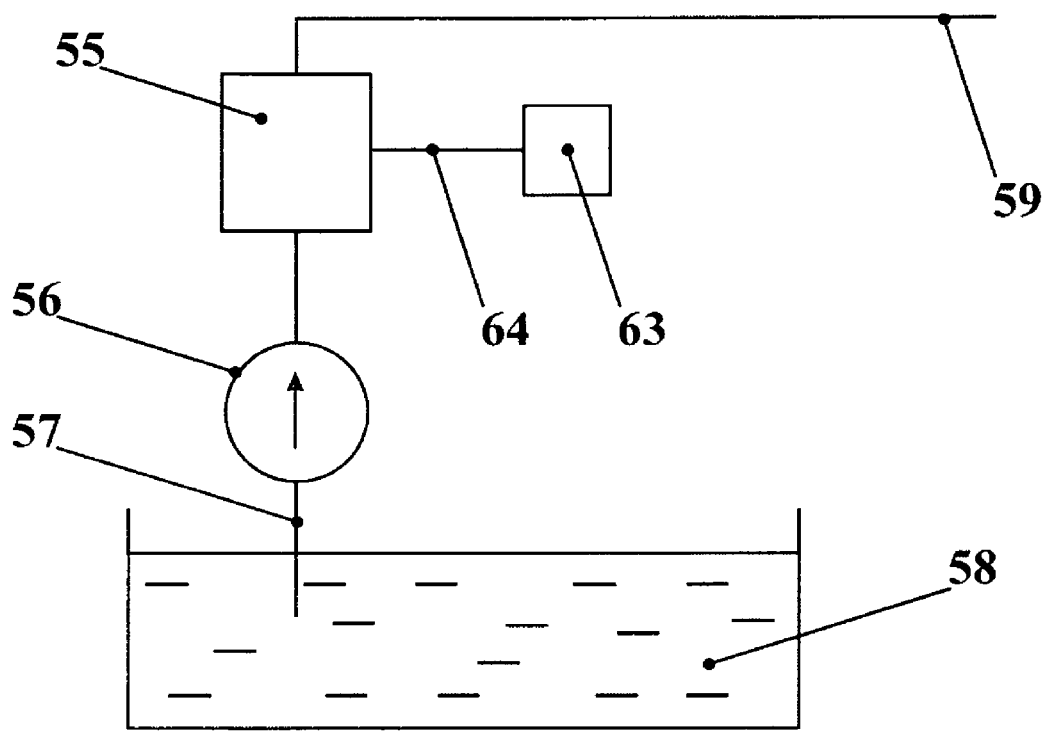
FIG. 10 illustrates a schematic view of the inventive nano-purifier with a water intake unit and a water evaporation unit (steam generator, evaporator), according to an embodiment of the present invention.

FIG. 10 schematically shows a WDPU with a water intake from a container 58, which is a settler (mud trap) and being part of a wastewater cleaning station. The WDPU 55 is connected with a water evaporation unit 63 by means of a pipeline 64. The unit 63 can be implemented as a water evaporator, steam generator, or a heat exchanger.

Figure 11:
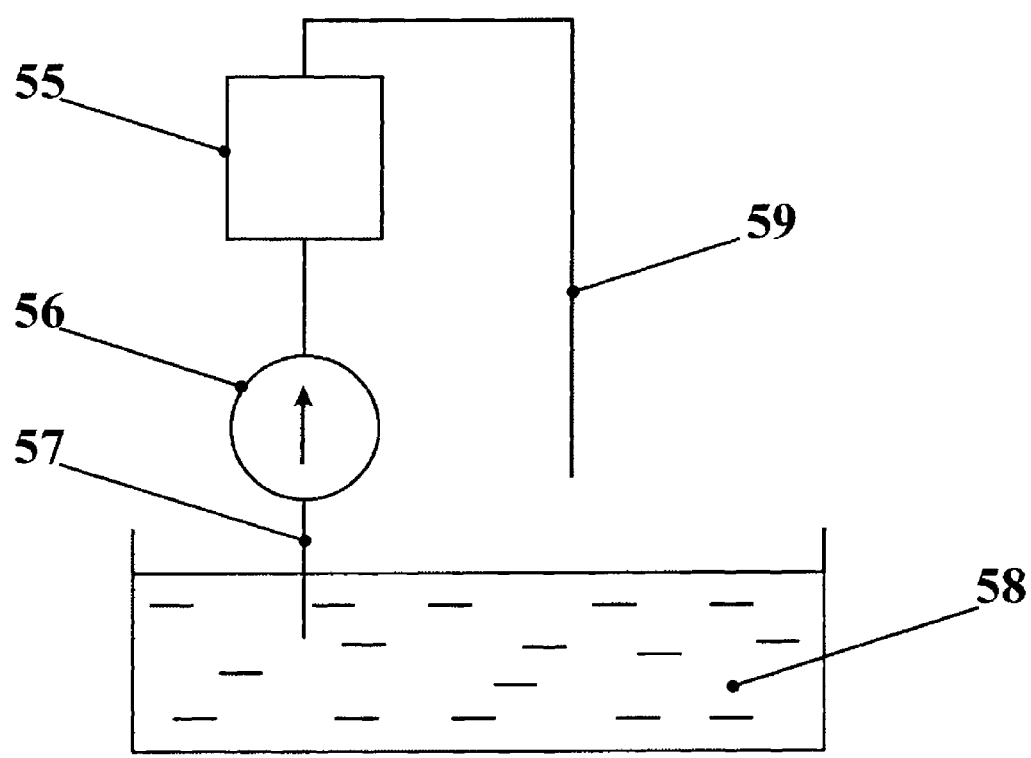
FIG. 11 illustrates a schematic view of the inventive nano-purifier with a water intake unit pumping water from a reservoir and returning water into the reservoir, according to an embodiment of the present invention.

FIG. 11 schematically shows a WDPU 55 with a water intake from a container 58 and a water reverse into the same container 58. There are shown a pump 56, an intake pipe 57, and a reverse pipe 59. The WDPU actively operates until the concentration of oil in water reaches a designated amount. The tests with a high oil concentration (up to 100 mL/L) resulted in practically full sedimentation of oil and harmful impurities. Disease-bearing bacteria were also destroyed.

Figure 12:
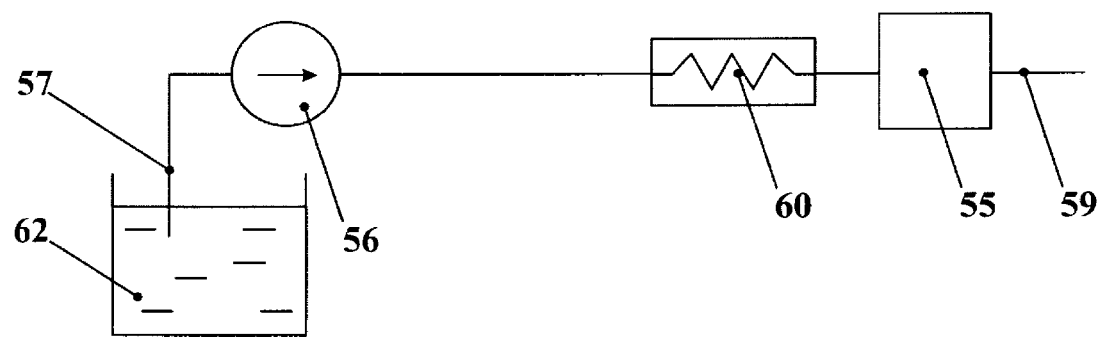
FIG. 12 illustrates a schematic view of the inventive nano-purifier with a water heater, according to an embodiment of the present invention.

FIG. 12 schematically shows a WDPU 55 with a water heater 60 mounted between the WDPU and a pump 56. Water is pumped by a pump 56 from a reservoir 62 via an intake pipe 57, and is further drawn into the heater 60 and introduced into the WDPU 55, wherefrom the purified water is delivered to consumers.

Water was heated up to 55-60° C. during the tests. The tests have shown that a temperature increase from 15, to 25, and further to 55° C. might allow increasing the minimal passage cross-section of the channel. Accordingly, the cavitation commencement speed could be reduced from 30, to 20, and even to 10 meter/sec corresponding to the above indicated temperatures.

The pressure of saturated steam was raised from 1.7, to 44, and to 16.4 kPa, corresponding to the above indicated temperatures. Thusly, the heat energy spent for heating water can be partially compensated by lowering energy necessary for acceleration of the liquid flow, and by a reduction of electric power consumed by the pump.

During the experiments, it was also established that when the temperature of water flow was lowered, its thermal content was insufficient for steam generation needed for cavitation in the flow.

At the same time, a lower pressure in the cavitation zone facilitates removal of gases dissolved therein, which results in filling the cavitation zone (normally filled with steam) additionally with non-condensed gases.

The later factor leads to a negative effect of damping cumulative action of the cavitation process. The final stage of cumulative action ends with partial amortization of hydro-impact by non-condensed gases during the movement toward each other of the walls of steam bubbles.

For neutralizing the negative effect, the WDPU may be furnished with a degasser for at least partial removal of gases dissolved in water, such as oxygen, nitrogen, etc.

Figure 13:
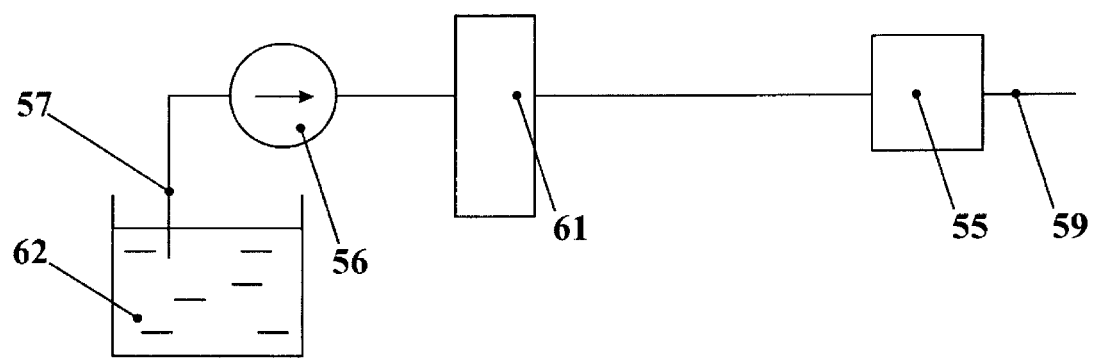
FIG. 13 illustrates a schematic view of the inventive nano-purifier with a degassing unit, according to an embodiment of the present invention.

FIG. 13 schematically shows a WDPU 55 with a degasser 61 mounted between a pump 56 and WDPU 55.

Figure 14:
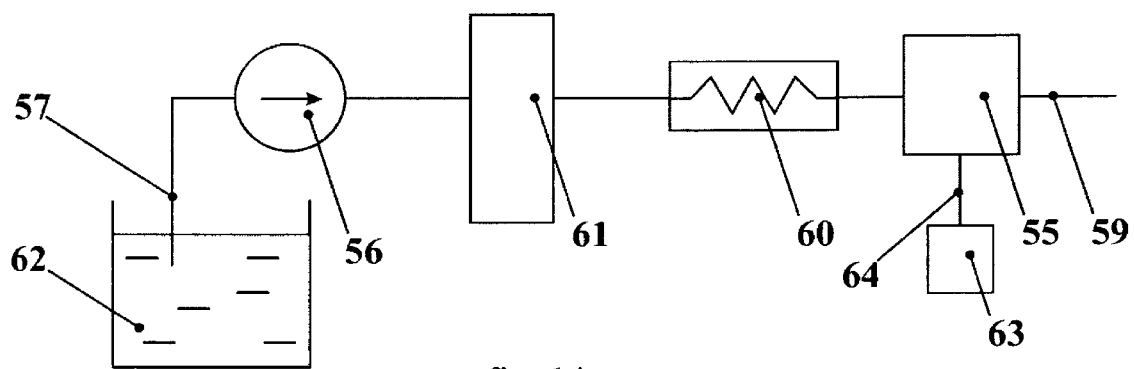
FIG. 14 illustrates a schematic view of the inventive nano-purifier with a steam generator, degassing unit, and water heater, according to an embodiment of the present invention.

FIG. 14 schematically shows a WDPU 55 with a degasser 61 and a water heater 60 sequentially connected to the entrance of the WDPU 55. Water for purification is pumped by a pump 56 from a reservoir 62 via an intake pipe 57. The purified water is deduced from the WDPU via an exit pipe 59 to the consumers.

A degassing of water is a process for removal from the water of undesirable or all gases dissolved in the water. It's known that degassing is used, for example, in drink production. For majority of technologies a remaining concentration of oxygen does not exceed 0.02 mGram/Liter. Oxygen can be removed in a degassing column furnished with loading with extended surface, wherein the gas phase is vacuumed. Reagent methods are also of broad usage, whereat oxygen is tied in reactions with various compounds. Lately, membrane filtration methods are widely employed, which methods allow for oxygen removal from water to final concentrations of less than 0.02 mGram/Liter. See also about degassing methods for bear production in Wasserentgasung in der Brauerei. Stumpf Matthias, Dittrich Stephan, Wasner Heinz. Gegenuberstellung der heute eingesetzten Verfahren Brauindustrie. 2004. 89, No 11, p. 46-52.

Figure 15:
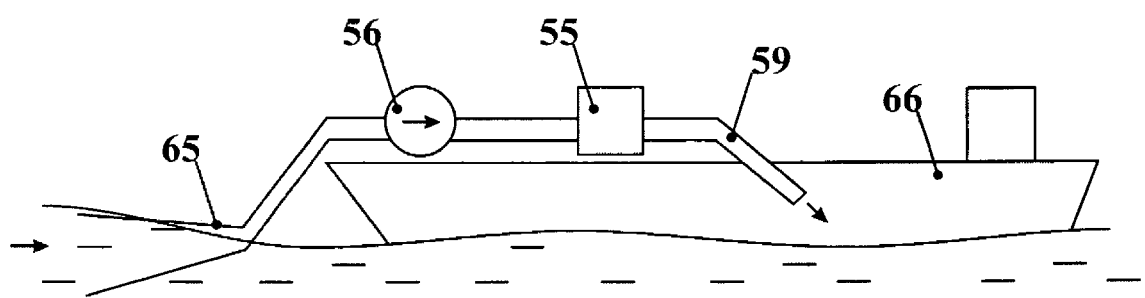
FIG. 15 illustrates a schematic view of the inventive nano-purifier mounted on a floatable device, according to an embodiment of the present invention. Such device can be represented by a ship, motor boat, pontoon, raft, etc.

FIG. 15 schematically shows a WDPU 55 rested on a on a floatable device, which can be represented by a ship, motor boat, pontoon, raft, etc. During experiments, the WDPU 55 was placed on a raft 66. Through a water intake unit 65, water was pumped from a water reservoir by a pump 56 into the WDPU 55 and returned into the water reservoir via an exit pipe 59. The WDPU 55 was powered by an accumulator battery through an electric current inverter.

The above description therefore shows that the invention has resolved the problem of purification of water from oil nano- and micro-particles.

It has been experimentally proven oil nano- and microparticles dissolved in water can be fully decomposed into hydrogen and carbon by subjecting the particles to cavitation in the inventive device. A reduction of the speed triggering the cavitation process (intensive cavitation) has been achieved, whereas the cavitation zone has been enlarged in the liquid flow channel. Besides, the time for sedimentation of heavy oil fractions in water has been reduced after the cavitation processing.

RELATED ART REFERENCES

1. Russian Federation Patent No. 2282492, to Kormilitsyn V. I., Astakhov D. N. issued 20, May 2001.
2. Kurochkin A. K. Cavitation-acoustic impact as an energy saving factor in chemical technology. Scientific Symposium "Saving energy in chemical technology". Kazan, Russia 2000, p. 64-68.
3. Kurochkin A. K., Smorodov E. A., Galiakhmetov R. N. Dipole-oriented hypothesis for acceleration of chemical processes under impact of cavitation./Prospective processes and products of lightweight chemistry. Materials of XIV International scientific-technological conference "Chemical reactants, reagents, and processes of lightweight chemistry". No. 5, Ufa, Russia, 6-8, Jun. 2001. p. 43-47.
4. Russian Federation Patent No. 2080300, issued to 'Volgograd State Technological University' on 27, May 1997.
5. Russian Federation Patent No. 2079435, issued to 'All-Russia Heat Technology Research Institute' on 20, May 1997.
6. Russian Federation Patent No. 2079435, issued to 'Vyatka State University' on 10, Aug. 2001.
7. Russian Federation Patent No. 99115919, issued to Closed Type Corporation "SVAROG" on 10, Jun. 2001.

We claim:

1. A device for purification of water from particles of petroleum and/or petroleum-derived products, collectively called oil particles, said device comprising:

a pump;

a water dynamic processing unit (WDPU) substantially connected to said pump, said WDPU comprising a housing, said housing enclosing a through channel for passing a liquid flow of water containing said oil particles, said channel including:

a first section having a variable passage cross-section decreasing downstream along a direction of movement of said liquid flow, said first section has a length S;

a minimal passage cross-section of said channel, said minimal passage cross-section has a diameter D;

a second section having a variable passage cross-section increasing downstream along the direction of movement of said liquid flow;

wherein said first section has an inner surface being in contact with said liquid flow, said inner surface of the first section includes a zone consisting of a plurality of protrusions and deepenings, wherein said protrusions each has a height, at least one of said protrusions has a maximal height greater than the heights of the other protrusions;

said zone is adjacent to said minimal passage cross-section, said zone has a length L and a width K defined according to the following formulas:

$K = mD$, wherein m is a coefficient taking on any value in the range of from 0.001, to 1;

$L = nS$, wherein n is a coefficient taking on any value in a range of from 0.1, to 0.5; and said WDPU is capable of operating under a pressure differential ranging from $0.1*10^5$ Pa to $25*10^5$ Pa.

* * * * *